Nov. 13, 1923. 1,474,085
J. R. MEREDITH
INNER TUBE
Filed April 18, 1922
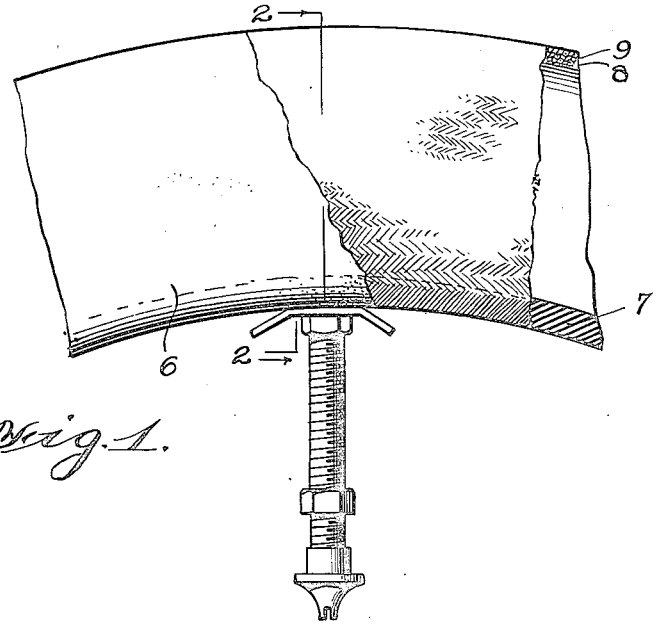
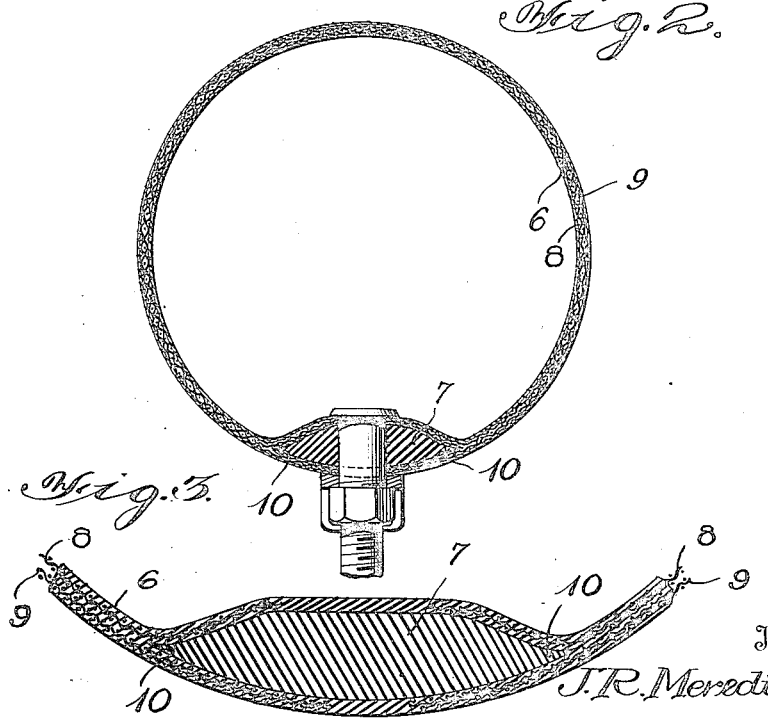
Inventor
J. R. Meredith
By Shreve, Crowe & Gordon
Attorneys Patented Nov. 13, 1923.

1,474,085

UNITED STATES PATENT OFFICE.

JOHN RUY MEREDITH, OF ATLANTA, GEORGIA.

INNER TUBE.

Application filed April 18, 1922. Serial No. 554,693.

*To all whom it may concern:*

Be it known that I, JOHN RUY MEREDITH, a citizen of the United States, residing at Atlanta, in the county of Fulton and State of Georgia, have invented new and useful Improvements in Inner Tubes, of which the following is a specification.

My invention relates more particularly to improvements in inner tubes for pneumatic tires, but is not to be regarded as limited strictly to this field, as the principles of the invention hereinafter set forth are capable of wide application in the manufacture of air tubes or containers of various types.

So far as I am aware inner tubes for pneumatic tires, as now manufactured, are composed either entirely of rubber or else entirely of some non-elastic textile fabric such as canvas, coated, impregnated, or otherwise covered with rubber to render the same air tight. The latter, or fabric tube, has an advantage over the rubber tube, in that it is far stronger and less susceptible to punctures and blow-outs, but it has the disadvantage of not being sufficient elastic to be efficient and satisfactory in service.

With the foregoing facts in mind the principal purpose of the present invention is to provide an inner tube which is composed partly of fabric or non-elastic material and partly of rubber and in such manner as to present the advantages of both the rubber and the fabric tubes previously alluded to without including the objectional features of either.

Another purpose of the invention is to provide an inner tube which is reenforced and permanently shaped at the inner or rim opposing portion thereof in a peculiar manner designed to obviate, to a large degree, rim cuts and wrinkling of the tube at this point.

With the foregoing and other objects in view, which will become apparent as the description proceeds, the invention resides in the construction, combination, and arrangement of parts, hereinafter more fully described and claimed, and illustrated in the accompanying drawings, in which like characters of reference indicates like parts throughout the several figures, of which:

Figure 1 is a fragmentary view in side elevation of a tube constructed in accordance with my invention, a portion of the outer rubber coating being removed to expose the fabric;

Figure 2 is a sectional view along the line 2—2 of Figure 1; and

Figure 3 is an enlarged detail view similar to Figure 2.

Referring more particularly to the drawings the inner tube constructed in accordance with my invention consists essentially of a non-elastic fabric section 6 and an elastic expansion element or strip 7 united by vulcanization, as hereafter explained, to form the complete wall of the tube.

The non-elastic section 6 forms the tread and side portions of the tube wall and is composed of inner and outer plies 8 and 9 of a suitable non-elastic textile fabric such, for example, as canvas. These two plies 8 and 9 are each coated on both sides with a suitable rubber compound to render the same impervious to air and are then united by vulcanization in such manner that the longitudinal edge portions of the plies are left inseparable from one another.

The elastic expansion element 7 is preferably composed of solid rubber in the form of a narrow strip having a relatively thick central portion and tapering or wedged shaped longitudinal edges 10, the latter being inserted between the separated edges of the plies 8 and 9 and united therewith, preferably by vulcanization, to form the complete tube.

The primary purpose of the strip 7 is to give to the structure of the tube the necessary elasticity which heretofore has been lacking in tubes composed mainly of non-elastic or textile fabrics. This strip, however, serves the further purpose of reenforcing and permanently shaping the inner or rim opposing portion of the tube in such manner as to minimize the possibility of rim cuts or wrinkling of the tube at this point.

By constructing an inner tube in accordance with the above the description a twofold advantage is accomplished, namely, the use of fabric which is much stronger and durable than rubber; and by use of an expansion element which so shapes the tube as to not only greatly aid in its insertion into a tire, but also reduces the probability of injuring by pinching when applying casing to the rim after the tube has been inserted therein.

It will be observed that I have constructed an inner tube for pneumatic tires less susceptible to blow-outs, adaptable to hard usage, yet simple in construction and economical to manufacture and at the same time so constructed as to lessen the possibility of rim cuts and pinching of the inner tube inserted in an outer casing.

It was to accomplish the above results by eliminating the deficiencies of the type of tubes now in use that I designed the tube forming the subject matter of this invention.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to within the scope of the appended claims without departing from or sacrificing any of the principles of this invention.

Having thus described my invention, and without enumerating variations and equivalents, what I desire protected by Letters Patent is as set forth in the following claim:

An inner tube for pneumatic tires comprising a two-ply non-elastic section forming a portion of the wall of the tube and an elastic section forming the remaining portion of the tube wall and secured at its edges between separate plies of the non-elastic section.

JOHN RUY MEREDITH.

Witnesses:
 Mrs. S. P. LEE,
 SCOTT CANDLER.